United States Patent
Bronstein et al.

(10) Patent No.: US 8,641,529 B2
(45) Date of Patent: Feb. 4, 2014

(54) SCHEDULED PROGRAMMATIC GAME CONTENT

(75) Inventors: Manuel Bronstein, Redmond, WA (US); Manoj Gupta, Sammamish, WA (US); Ivann Alvarado, Duvall, WA (US); Colin Riley, Redmond, WA (US); Matt Van Gorder, Redmond, WA (US); Hao Chen, Redmond, WA (US); Gary Hall, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 12/163,410

(22) Filed: Jun. 27, 2008

(65) Prior Publication Data

US 2009/0325711 A1    Dec. 31, 2009

(51) Int. Cl.
*A63F 9/24* (2006.01)
*A63F 13/00* (2006.01)

(52) U.S. Cl.
USPC ................................ 463/42; 463/25; 463/29

(58) Field of Classification Search
USPC ................................. 463/25, 29, 42
See application file for complete search history.

(56) References Cited

U.S. PATENT DOCUMENTS

| | | | |
|---|---|---|---|
| 5,267,734 A | 12/1993 | Stamper et al. | |
| 6,354,943 B1 | 3/2002 | Miura | |
| 6,932,708 B2 * | 8/2005 | Yamashita et al. | 463/42 |
| 7,243,364 B2 | 7/2007 | Dunn et al. | |
| 2001/0004609 A1 * | 6/2001 | Walker et al. | 463/42 |
| 2002/0169013 A1 * | 11/2002 | Serizawa et al. | 463/6 |
| 2006/0240894 A1 | 10/2006 | Andrews | |
| 2006/0287097 A1 * | 12/2006 | Moshal | 463/42 |
| 2007/0044127 A1 | 2/2007 | Vaysman et al. | |
| 2007/0191101 A1 | 8/2007 | Coliz et al. | |
| 2007/0232384 A1 | 10/2007 | Pace | |
| 2007/0238525 A1 | 10/2007 | Suomela | |
| 2007/0293320 A1 | 12/2007 | Nguyen et al. | |
| 2008/0026846 A1 | 1/2008 | McMaster | |
| 2008/0045336 A1 | 2/2008 | Stelzer et al. | |
| 2009/0270155 A1 * | 10/2009 | Glass et al. | 463/16 |

FOREIGN PATENT DOCUMENTS

| | | |
|---|---|---|
| JP | 2005-103326 A | 4/2005 |
| KR | 10-0493821 B1 | 6/2005 |

OTHER PUBLICATIONS

Game Sentinel 1.1, Copyright 1997-2007 FileDudes.com, http://www.filedudes.com/Game_Sentinel-download-32246.html.

(Continued)

*Primary Examiner* — Arthur O. Hall
*Assistant Examiner* — Jasson Yoo
(74) *Attorney, Agent, or Firm* — Vierra Magen Marcus LLP (57) ABSTRACT

Scheduled programmatic multiplayer game content in a console service is provided. A plurality of multiplayer game events is scheduled. Each event has a fixed start time and fixed end time. Requests from users to participate in event are received and a determination is made as to whether users electing to participate in the game are eligible to participate. If the user is eligible to participate in the game, instructions are provided to a console to allow the user to participate in the game. If the user is not eligible to participate in the game, instructions may be provided to a console to allow a user to view activity in the game.

19 Claims, 9 Drawing Sheets

(56) References Cited

OTHER PUBLICATIONS

International Search Report & The Written Opinion of the International Searching Authority dated Feb. 12, 2010 in International Application No. PCT/US2009/048272 filed Jun. 23, 2009.
Chinese Office Action dated Feb. 2, 2012, Chinese Patent Application No. 200980134144.3.
English translation of claims as amended in Response to Office Action dated Aug. 1, 2012, Chinese Patent Application No. 200980134144.3.
Office Action dated Dec. 31, 2012 in Chinese Patent Application No. 200980134144.3.
Response to Office Action filed Jan. 11, 2013 in Chinese Patent Application No. 200980134144.3.
English Summary of Response to Office Action and English translation of claims as amended in Response to Office Action filed Jan. 11, 2013 in Chinese Patent Application No. 200980134144.3.
Decision on Rejection dated Apr. 1, 2013 in Chinese Patent Application No. 200980134144.3.

* cited by examiner

SCHEDULED PROGRAMMATIC GAME CONTENT

BACKGROUND

The console and personal computer-based video game experience has evolved to include multiplayer online gaming. Gaming systems have evolved from one in which an isolated gaming experience was provided into one where users can share a common game experience though networked systems. This provides a rich, interactive experience which may be shared in real time between friends and other gamers. With Microsoft's Xbox® video game system and Xbox Live® online game service, users can now easily communicate with each other while playing to share the gaming experience.

Users can track their own and their friends' progress through different games through the concept of game scores and achievements on publicly accessible leader boards maintained by a console gaming service. Another innovation in current gaming systems is the ability to quickly and easily download games. For example, Microsoft introduced a gaming service known as Xbox Live Arcade which is able to connect to a server through the Internet when the gaming console is connected to the Internet. From the server site, Arcade is able to provide full version games which are available for download to the user's hard disc drive on the Xbox console.

Generally, online console game systems allow one to four players to interact in a game hosted by one of the parties. These multiplayer games are scheduled by the users, one of whom generally hosts the game on their console.

SUMMARY

Technology is presented which provides delivery and maintenance of scheduled programmatic multiplayer game content in a console service. Multiplayer game events are scheduled with a fixed duration at a fixed start and end time. Users may select to participate in the game at any time before the game starts. Once the game starts, users may view the game as a non-participant. The games end when the fixed duration expires. A game schedule is provided in a manner similar to an electronic program guide on a television, and users select to participate in games by highlighting the game and selecting an appropriate indicator on a game controller. Once a game is selected, if the user is eligible to participate in the game, the user can play the game at the scheduled time until completion of the game.

A method in accordance with the technology includes providing a multiplayer gaming experience in a multiplayer gaming environment. First, a plurality of multiplayer game events is scheduled. Each event has a fixed start time and fixed end time. For each of the plurality of game events, requests from users to participate in event are received. A determination is made as to whether users electing to participate in the multiplayer game prior to the fixed start time are eligible to participate in the game. If the user is eligible to participate in the game, instructions are provided to a console to allow the user to participate in the game. If the user is not eligible to participate in the game, instructions may be provided to a console to allow a user to view activity in the game.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

The present system will now be described with reference to FIGS. 1-10, which in general relate to technology for delivering and maintaining scheduled programmatic multiplayer game content in a console service. Multiplayer game events are scheduled with a fixed duration at a fixed start and end time. Users may select to participate in the game at any time before the game starts. Once the game starts, users may view the game as a non-participant. The games end when the fixed duration expires. A game schedule is provided in a manner similar to an electronic program guide on a console, and users select to participate in games by highlighting the game and selecting an appropriate indicator on a game controller. Once a game is selected, if the user is eligible to participate in the game, the user can play the game at the scheduled time until completion of the game.

Figure 1:
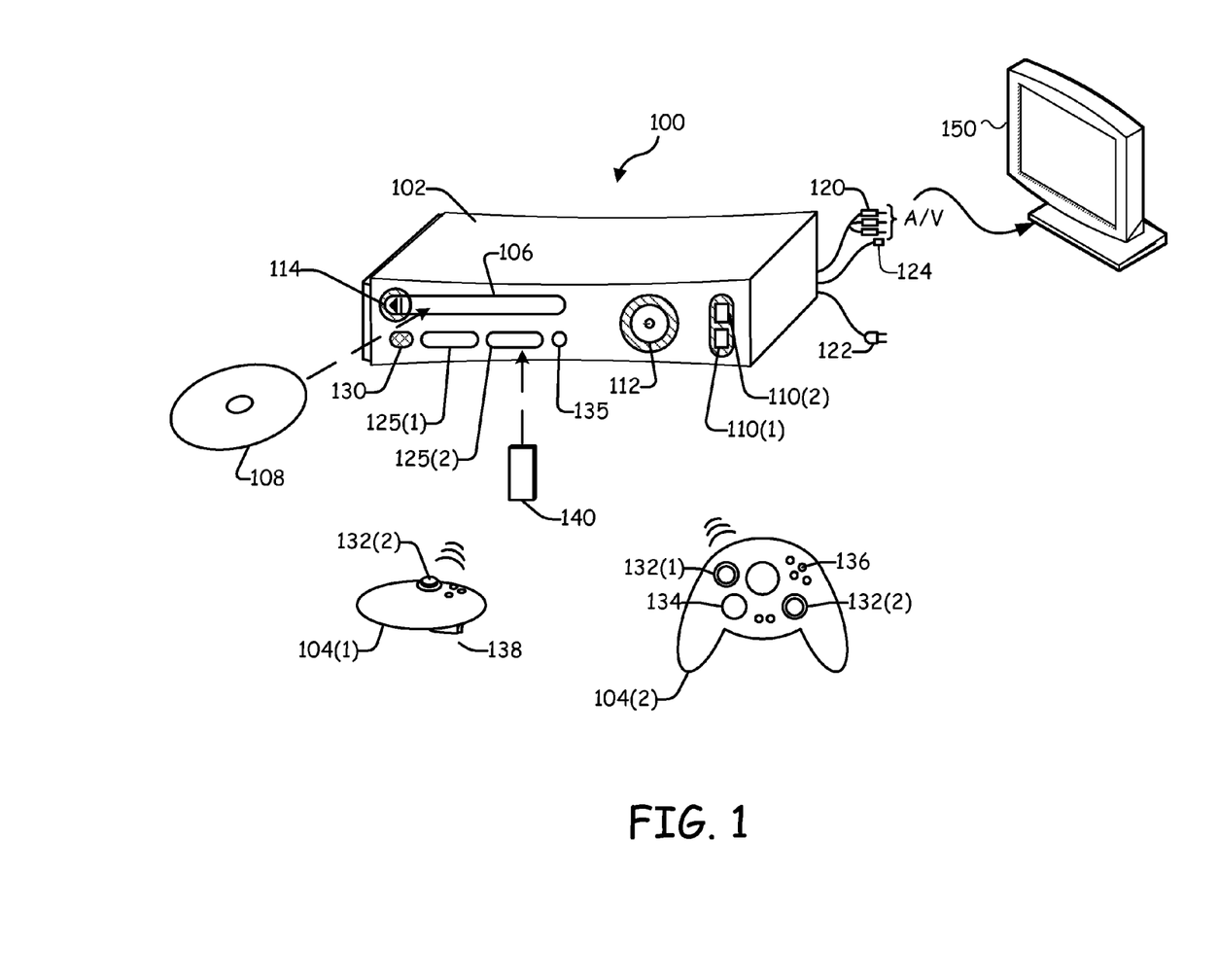
FIG. 1 is an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140.

During operation, console 102 is configured to receive input from controllers 104 and display information on display 150. For example, console 102 can display a user interface on display 150 to allow a user to select a game using controller 104 and display achievement information as discussed below.

Figure 2:
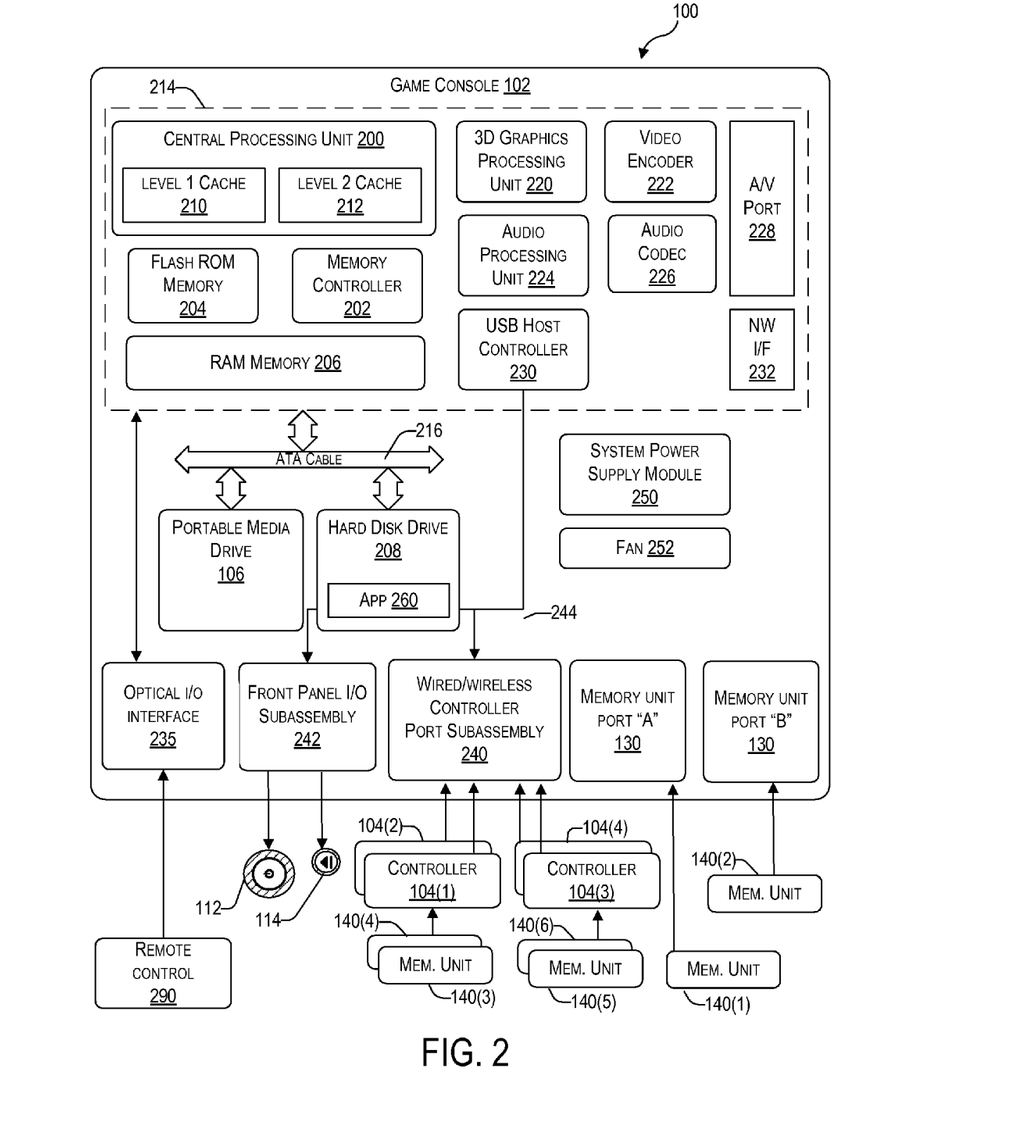
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2 shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202.

A system power supply module 250 provides power to the components of gaming system 100. A fan 252 cools the circuitry within console 102.

An application 260 comprising machine instructions is stored on hard disk drive 208. When console 102 is powered on, various portions of application 260 are loaded into RAM 206, and/or caches 210 and 212, for execution on CPU 200, wherein application 260 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed below in connection with FIG. 3.

Figure 3:
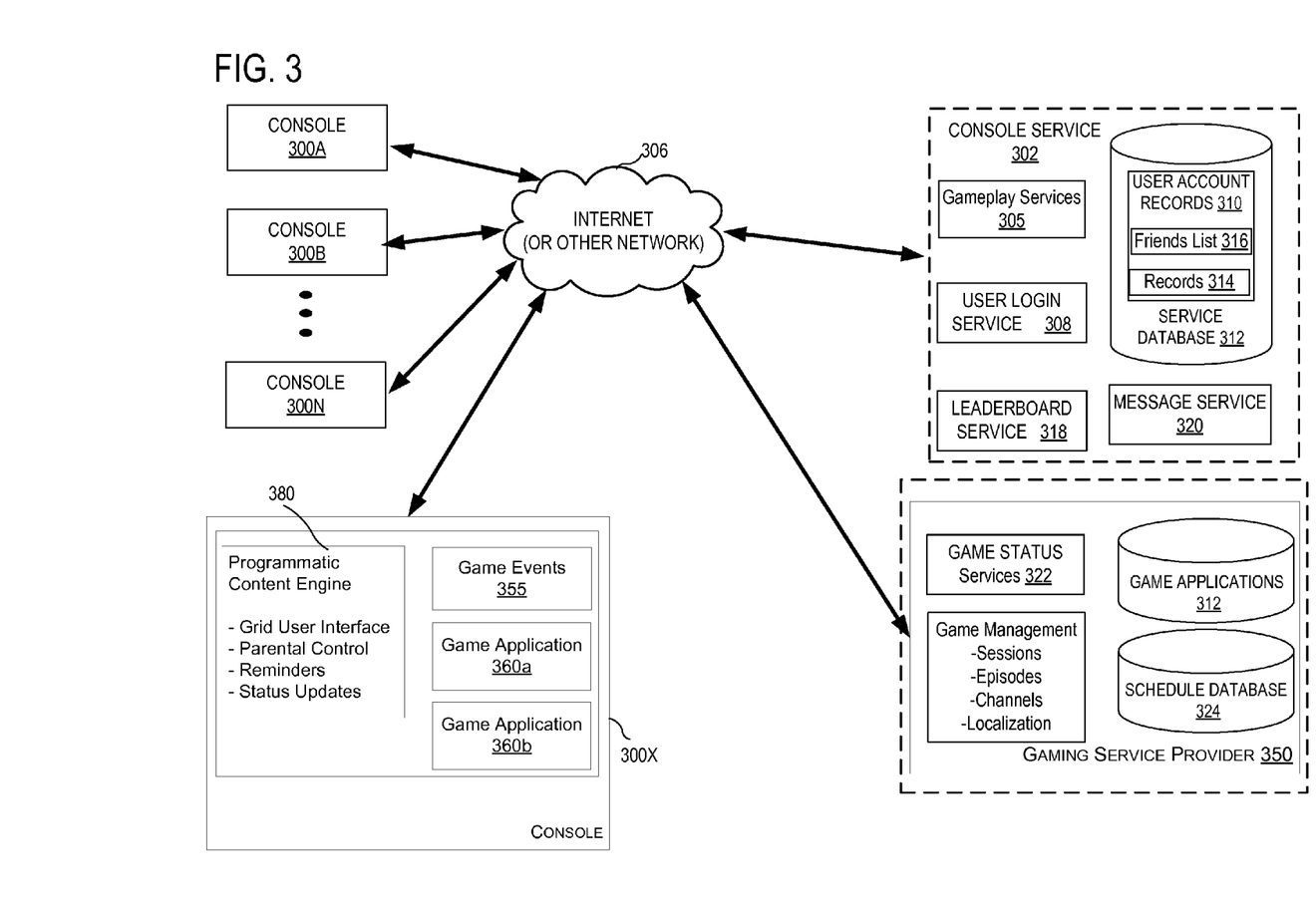
FIG. 3 is a block diagram of an exemplary operating environment for rendering achievement information.

FIG. 3 provides a block diagram of an environment for implementing the present technology. In one example, multiple consoles 300A-300X are coupled to a network 306 and can communicate with a console service 302 having one or more servers through network 306. Also present and coupled to the network is a gaming service provider 350. In one embodiment, network 306 comprises the Internet, though other networks such as LAN or WAN are contemplated. Each of the devices illustrated in FIG. 3 include a communication component capable of receiving information from and transmitting information to consoles 300A-X and provide a collection of services that applications running on consoles 300A-X may invoke and utilize.

The console service 302 and the gaming service 350 may be combined and offered by a single service provider and/or on a single server. Alternatively, the service providers may be different entities. In yet another embodiment, the gaming service server may be provided as a product in the form of hardware and software included on a non-volatile storage medium.

Consoles 300A-X may invoke user login service 308, which is used to authenticate a user on consoles 300A-X. During login, login service 308 obtains a gamer tag (a unique identifier associated with the user) and a password from the user as well as a console identifier that uniquely identifies the console that the user is using and a network path to the console. The gamer tag and password are authenticated by comparing them to user records 310 in a database 312, which may be located on the same server as user login service 308 or may be distributed on a different server or a collection of different servers. Once authenticated, user login service 308 stores the console identifier and the network path in user records 310 so that messages and information may be sent to the console.

User records 310 can include additional information about the user such as game records and friends list. Game records 314 include information for a user identified by a gamer tag and can include statistics for a particular game, achievements acquired for particular game and/or other game specific information.

The friends list 314 includes an indication of friends of a user that are also connected to or otherwise have user account records with console service 302. The term "friend" as used herein can broadly refer to a relationship between a user and another gamer, where the user has requested that the other gamer consent to be added to the user's friends list, and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case.

User records 310 also include additional information about the user including games that have been downloaded by the user and licensing packages that have been issued for those downloaded games, including the permissions associated with each licensing package. Portions of user records 310 can be stored on an individual console, in database 312 or on both. If an individual console retains game records 314 and/or friends list 316, this information can be provided to console service 302 through network 306. Additionally, the console has the ability to display information associated with game records 314 and/or friends list 316 without having a connection to console service 302.

Gameplay management services 305 manage multiplayer games by aggregating events from users, executing gameplay rules and outputting results to users involved in individual multiplayer games. Gameplay services 305 may manage a plurality of multiplayer game events concurrently.

The console service 302 also includes a message service 320 which permits one console, such as console 300A, to send a message to another console, such as console 300B. The message service 320 is known, the ability to compose and send messages from a console of a user is known, and the ability to receive and open messages at a console of a recipient is known. Mail messages can include emails, text messages, voice messages, attachments and specialized in-text messages known as invites, in which a user playing the game on one console invites a user on another console to play in the same game while using network 306 to pass gaming data between the two consoles so that the two users are playing from the same session of the game. Friends list 316 can also be used in conjunction with message service 320.

In accordance with the technology, a gaming service provider 350 may host a gaming service server 375 to allow a multitude of users on consoles 300A-300X participate in a group game environment based on programmatic content scheduled for participation between a designated start time and a designated end time. The group may be as small as two users and may include hundreds of thousands of users. The gaming service server 350 obtains game data and state information from the console service 302, which it uses to provide information to console users. It will be understood that the gaming service provider 350 and the console service 302 may be integrated into a single service and/or a single server. Alternatively, the gaming service 350 may not be managed by the same administrator of the console service 302 or different administrators.

Console 300X illustrates functional components which may be present on each of the consoles 300A-300X. Each console 300A-300X may be of a type such as that illustrated in FIGS. 1 and 2, in which embodiment the functional components may comprise one or more sets of instructions or applications instructing the processor 200 to perform the functions described herein. Such functional components may be implemented in hardware, software or a combination of hardware or software. Moreover, the instructions may be embodied in a computer readable medium. A computer readable medium may include both volatile and nonvolatile, removable and non-removable media implemented in any method or technology for storage of information such as computer readable instructions, data structures, program modules or other data. Computer readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710.

Also shown in FIG. 3 with respect to the gaming service server 350 are gaming status services 322 and game management services 330. The game status services 322 collect user game statistics and tracks which friends of a particular user on one of the consoles 300a-300x are participating or scheduled to participate in an online program game. Game management services provide the gaming environment while actual control over game play is handled by the console service. In addition, the game management services provide organization of the program game content, breaking down the games into different sections, episodes, organizing the games into different channels, and ensuring that localized content is directed to the proper console and user.

In accordance with the technology, scheduled programmatic game content is delivered to a console or other processing device at a specific time and for a specific duration. A multiplayer game is scheduled in a manner similar to a broadcast television program—the game has a fixed start and a fixed end time. Users select to participate in the game either within a pre-game window in advance of the scheduled programmatic time. When a user selects to participate in a game, the game management services and a programmatic content engine on the console ensures that the user has the necessary content and application programs in order to participate in the game.

Game status services 322 allow a user to determine which of the user's friends might be participating in an upcoming game. Also included in the gaming is a scheduling database 314 and a library of game applications 312. As discussed below, game play in a scheduled game is enabled by a game application. Game applications may comprise instructions executed on each of the consoles to allow one or more users interacting with the console to participate in the scheduled programmatic game. Application instructions necessary to enable game play an be downloaded in whole or in part when a user schedules activity in a prescheduled game, or retrieved from a storage medium in the console. Schedule database 314 tracks both the programmatic content scheduling—when particular game activities are to occur and end—as well as which users have indicated a willingness or desire to participate in the scheduled game. Information from the schedule database 314 can be used to provide status services to each console to indicate which of the user's particular friends might be participating in a programmatic game.

Console 300x illustrates functional components present on a console or other processing device in order to implement the technology discussed herein. Console 300x (as well as consoles 300a-300n) will include one or more game applications 360a, 360b. The game applications may be delivered via a download from the game applications data store 312, may be present in non-volatile memory such as Flash ROM memory 204 in the console, or may be provided on a computer storage medium such as a CD ROM, or other disk. A programmatic content engine 380 is also utilized on the console. The programmatic content engine provides a game selection interface, generally in the form of a grid and illustrated at FIGS. 5 and 6, parental control functionality, game reminder functionality, and friend or game status updates. The programmatic content engine may also provide a set of foundational components such as libraries, methods, tools and data which are re-usable by programmatic content games running on the console.

When games are executed on the console, new game events 355 occur when a user provides input to the game, or as a result of other user's input to the game being returned to the console. Events caused by user activity on the console are transmitted to the console service 302 which manages the game playing function.

Figure 4:
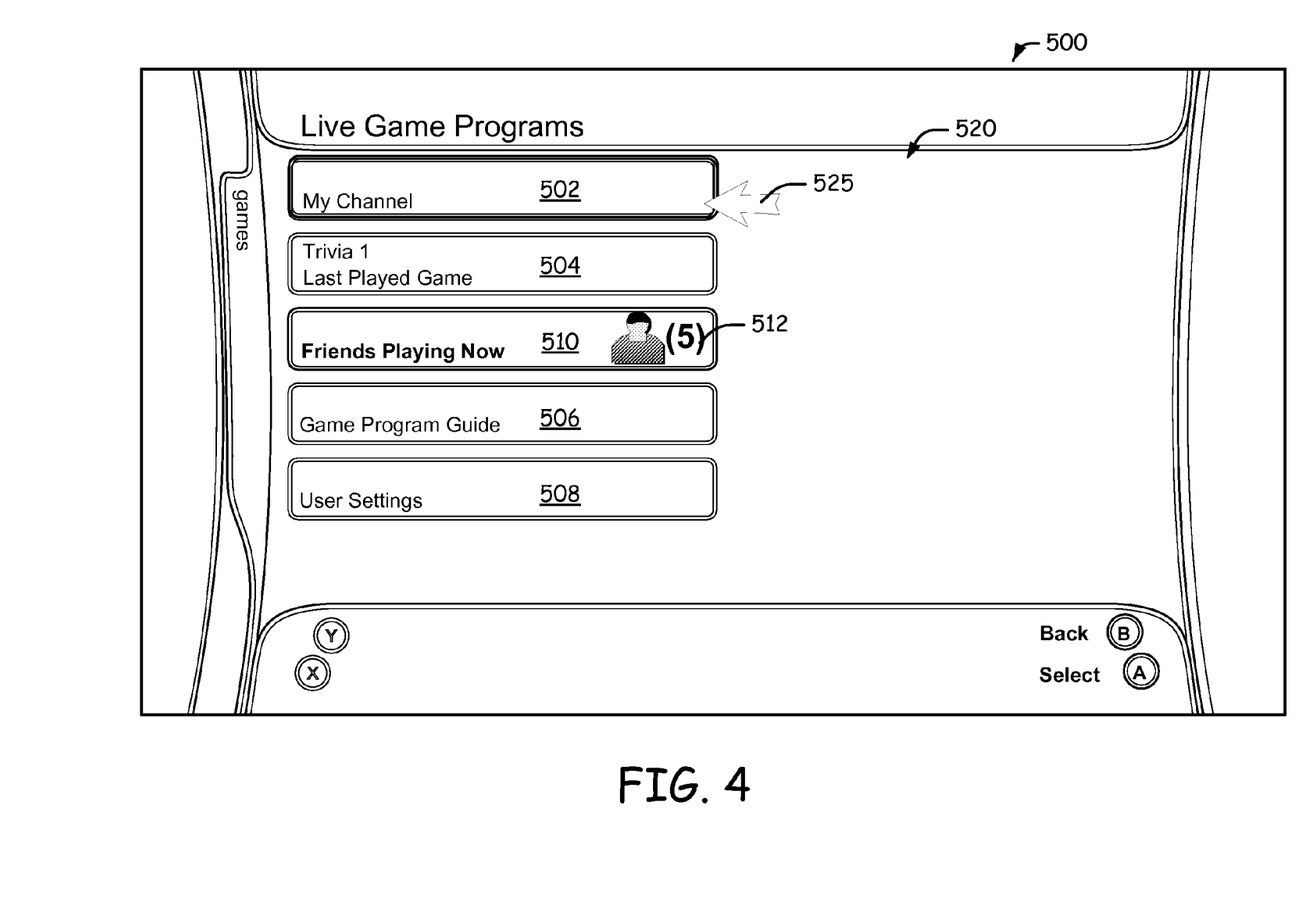
FIG. 4 illustrates a user interface allowing the user to select between one of a number of interface displays.
Figure 5:
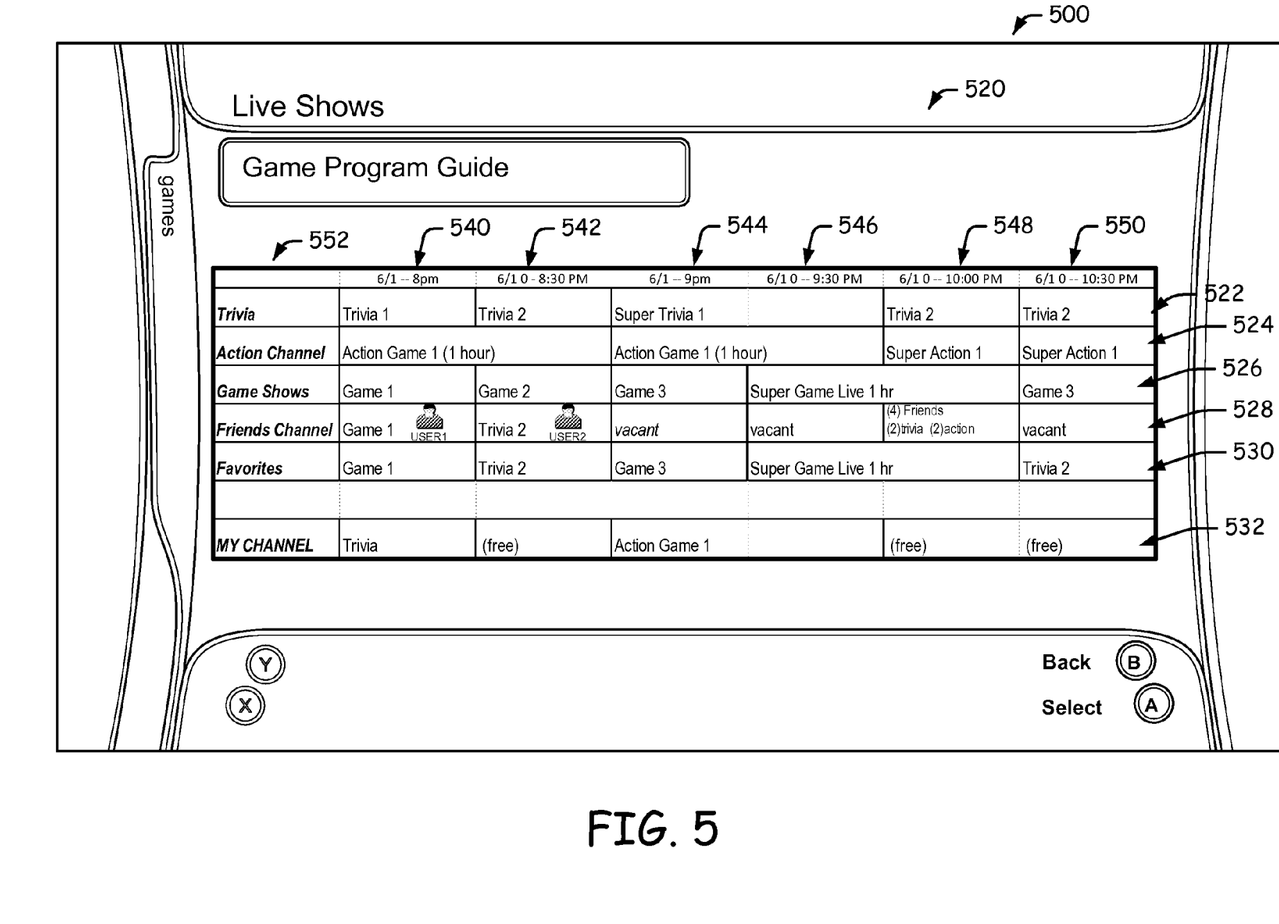
FIGS. 5 and 6 illustrate a scheduled programmatic content grid utilized in accordance with the present technology.
Figure 6:
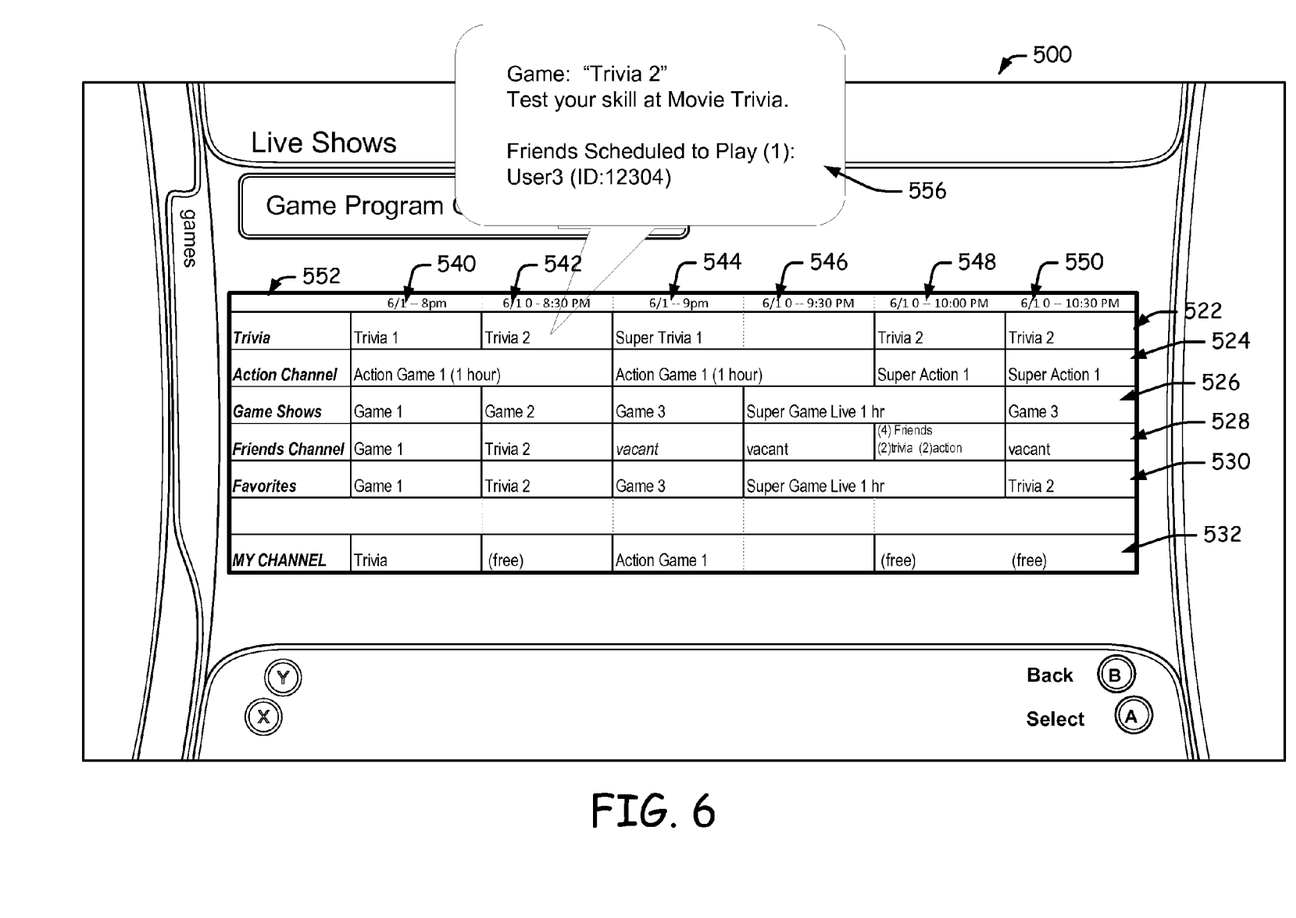

FIG. 4 illustrates an exemplary user interface allowing a user to select between one of a number of methods for interacting with programmatic content. Interface elements 502, 504, 506, 508, and 510 are user selectable buttons which may be selected by a user moving an icon 525 over one of the respective elements, using the control sticks 132, 134 of the controller 104, or by another visual indicator such by highlighting one of the visual elements 502-510 responsive to positioning instructions received from the controller 104. Selection of element 502 may display a "My Channel" listing which provides a user with an illustration of all of the programmatic content in which a user may have selected to participate in the future. Element 504 is a "Last Played Game" element which allows a user to review his performance in the last game played by the user in the programmatic content environment. The Last Game Played element 504 indicates that the user last played "Trivia 1." The Game Program Guide element 506 allows a user to bring up a programmatic grid illustrated in FIGS. 5 and 6 showing the user which of a number of available games can be selected by a user during a number of forthcoming times. A user settings element 508 allows a user to display an user-settings input screen and input programmatic content preferences and settings into the console. The settings can include localization elements, language elements, parental control age settings, or other settings which are relevant to a game played by the user.

A "friends playing now" element 510 allows a user to select and view the participation of a user's friends in games, or upcoming scheduled participation in games by the user's friends. Selection of this indicator allows the user to view a friend's current participation in a current game event.

FIG. 5 illustrates a user interface for a programmatic game guide 520. Interface 520 is organized in the form of a grid having rows 522-532, and columns 540-550. Each column represents a half-hour segment of time. Any number of rows and columns can be displayed on the user interface 520. Column 552 lists the heading of the game channel. Rows are organized into channels based on content. In this example, row 522 is a trivia game channel, row 524 is an action game channel, row 526 is a game show game channel, row 528 is a friends channel, row 530 is a favorites channel and row 532 is a My Channel listing. Although row 532 represents one manner in which a "my channel" listing may be presented to a user, other manners of listing programmatic scheduling may be used. For example, any channel may be represented in a calendar view having monthly, weekly or daily views which can be selected by the user, with programmatic entries represented as calendar events.

Rows 522, 524 and 526 illustrate channels which list thematic game events. For example, all games on the trivia channel in row 522 have a trivia game theme. Games in this genre include those where contestants in the game may be asked a series of trivia questions for points. Likewise, all shows in the game show channel have a game show theme. Games in this genre may mimic popular broadcast television game shows. Additional types of channels may be utilized. For example, games that are available in a particular language, or games available in a particular region may be grouped into channels.

Users select to participate in games by highlighting the game and selecting an appropriate indicator on a game controller. Once a selection is made, a confirmation that the user intended to select to participate in the game may be required. Once the selection is confirmed, a determination will be made as to whether the user is eligible to play the game based on a number of factors including the time of the request, the age and locale of the user, and other factors.

Games in the friends channel illustrate games in which a user's friends may be participating. In row 528 at column 540, the user interface presents an indication that the user's friend, User 1, is participating in Game 1 on the game show channel. In row 528 at column 542, user's friend, User 2, is participating in a trivia game, Trivia II, at 8:30 p.m. At row 528, column 548, user interface notes that four of the user's friends are participating in different games, two in the trivia category and two in the action category. It will be understood that different types of representations of friend participation (icons, text and the like) can be utilized to illustrate which of the user's friends are participating in the game.

The My Channel schedule indicated at row 532 presents games that the user has previously selected to join in advance. As indicated in row 532, the user has indicated a desire to participate in the Trivia I game at 8:00 p.m. and the action game at 9:00 p.m. The user has vacant time slots between 8:30 and 9:00 p.m. and between 10:00 and 11:00 p.m. A more detailed My Channel interface may be provided upon selection of the My Channel user interface element 502, which would allow a more detailed listing of the games, or more or an additional number of games in the user's schedule to be listed. For example, the My Channel user indicator 502 may present a week or month's worth of information of all the games in which the user has selected to participate.

Additional information may be provided when the user highlights any of a user icon or box in the grid. FIG. 6 shows an indication of how additional information may be provided when a user selects one of the elements in a grid interface 520. Highlighting the grid at row 522 in column 542 for the "Super Trivia II" game may present a popup window 556 which details which users are participating in which games. The information in the window indicates that the user's friend, User 3, is scheduled to play Trivia II game and that the subject of the game is movie trivia. It will be well understood that any number of popup or fashion of popup indication may be provided, and any amount of information may be included in window 556.

The favorites channel indicated at row 530 provides a list of games which the user has participated in the past, or those which the user has specifically designated as a "favorite." Favorites can be saved to allow a user to quickly access upcoming schedules for certain games in the favorites channel.

Figures 7, 8:
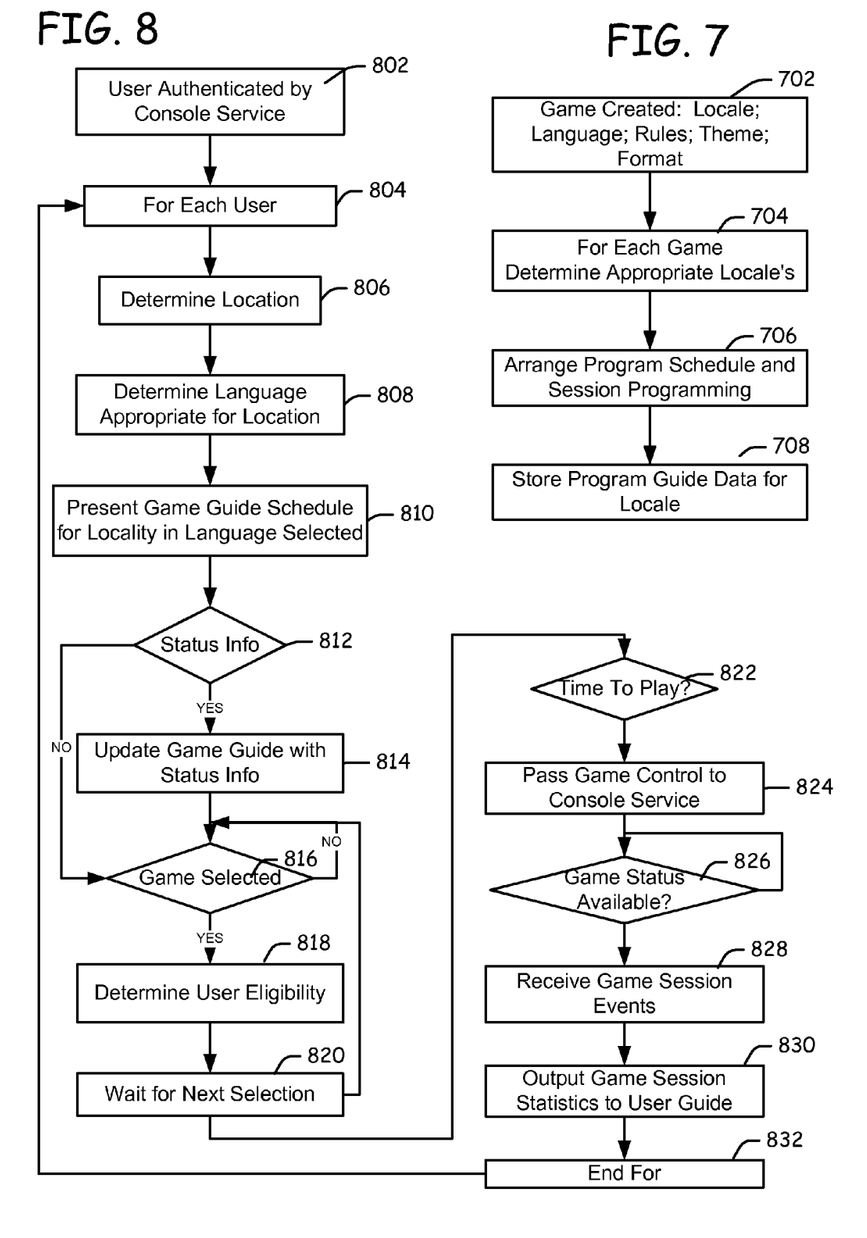
FIG. 7 illustrates a method performed by a developer to provide scheduled programmatic content to users.
FIG. 8 illustrates a method performed by a game manager when a user authenticates and selects to perform a prescheduled programmatic event.

FIG. 7 illustrates the steps provided by a game developer and a game management server administrator to provide information to console users. At step 702, a game will be created for presentation to a number of participants/users. Each game will include, for example, game play rules, participation rules, a game theme or playing format, a specified duration, one or more specified user regions or locations appropriate for the game, a language for the game, and other indicators regarding appropriate uses for the game including user age ratings. Other examples of game rules include a total participant limit, or a minimum participant requirement. In all cases, games have a fixed duration. Each game may also be defined with a minimum time before the scheduled start of the game to allow a user to join the game as a participant. Up to this designated time before the game starts, users may enter the game as participants. After the designated time, users may only enter the game as a viewer, or in a role other than as a participant. In addition, because users have the opportunity to schedule participation in the game in advance of the actual playing of the game, users will have other opportunities to play different episodes of the game at different times.

At step 704, for each game, a determination of the appropriate locales for the game is made. Games may be locale-specific, such as specific to a particular country, a number of countries with a common language, a region within a country, or may be worldwide. Locales may determine the language in which a game is to be offered, or games may be offered for the same locale in different languages. A determination of which games to be offered to a user can be made according to user preferences set by the user using a settings interface. One or more game schedules is then created for a locale at step 706. Once the appropriate games are arranged in a schedule at step 706, program guide data for a locale is stored at step 708. As discussed below, a console will download the user guide data for the user to allow the user to select particular games for use in the gaming environment.

FIG. 8 illustrates the method performed to present users with a variety of games, and to manage the user's participation in the games. The game management services provide scheduling and statistical information, while actual participation in game play activities is managed by a console service 302. Console service 302 in one example, is the XBox 360 Live Service currently available from Microsoft Corporation. Interaction between the console service and the gaming service server occurs as statistics and scheduling information for users and games are provided from the console service to the gaming service server. At step 802, the console service 302 authenticates a user for participation in the scheduled game environment. This information is transmitted to the gaming service for use in determining which information schedule to provide to the user. For each user at step 804, a determination is first made as to the user's location at step 806 and at step 808, a determination of the appropriate language for that location is made. If a user has specified their location, and/or has specified their preferred language, this information can be derived from the user's settings. If the user has not specified this location, other factors may be used to determine a user's location and the appropriate language for that location. At step 810, the programmatic content schedule for the particular locale and in an appropriate language is provided to the console.

Once the information is provided by the game management services to the console, the programmatic content engine can present the program scheduling UI illustrated in FIGS. 5 and 6. At step 812, if status info is available on a user's friends, this information will be added to the program grid at step 814. Status information can be updated dynamically as a user's friends make selections to participate in games and as their participation achievements are returned to the gaming status services 322.

Once a user is presented with guide info, the method waits at step 816 for selection of a particular game from a console. Once a game is selected, at step 818, the method will determine whether a user is eligible to play the game at step 818. One implementation of step 818 is discussed below with respect to FIG. 9. Essentially, the method determines whether or not the user has selected to participate in a game in advance of the scheduled game time as well as whether other rules relating to the game have been met. If the user is not eligible, as discussed with respect to FIG. 9, they may be offered the opportunity to join the game as a viewer, or just denied entry into the game. At step 820, the method awaits additional game selections at step 816. When a selected game's scheduled time has arrived at step 822, in-play game control is passed to the console service at step 824. The game manager waits for game status information at step 826 and upon receipt of game status information, accepts the game status events at step 828 and outputs game session statistics to the user guide at step 830. As noted above, the method perform steps 806-830 for each user.

Figure 9:
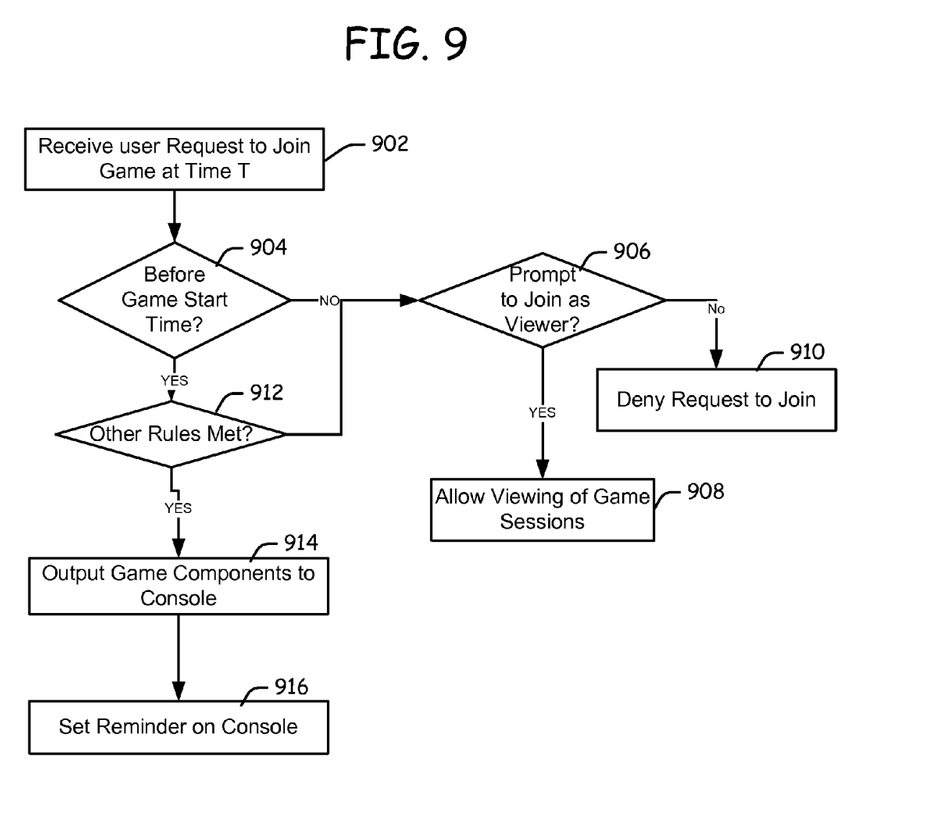
FIG. 9 illustrates a method for determining whether or not a game is available to a particular user.

FIG. 9 illustrates a method for determining whether or not a user is eligible to participate in a particular game. At step 902, the request to participate in a game is received when a user selects a game at step 816. At step 904, an initial determination is made as to whether a user has selected to participate in a game a sufficient time before the actual start time of the game event. The length of time before a start of a game that a user must join the game is dependent upon the complexity of the game, the length of the game, and other factors decided upon by the game's provider. If the user has not selected to participate in the game within a sufficient time before the actual start of the game, at step 906 the user may be prompted to indicate whether or not they prefer to join the game as a viewer at step 906. If the user answers yes, then at step 908, the user will be joined to the game as a viewer. If the user declines, the user will be denied access to the game altogether at step 910.

If the user is requesting to join the game a sufficient time before the start of the scheduled game, then at step 912, the method will determine whether other relevant requirements of the game are met. These requirements may include, for example, whether the maximum number of participants has been reached, whether a user is in a correct location with the correct language, or whether the user meets other rules of participation in the game such as an age requirement. If the user does not meet these requirements, the method may return to step 906 prompting the user to join the game as a viewer as discussed above. In some cases, such as where a person is not of sufficient age to participate in or view a game, step 906 may be skipped and the user request to join the game declined at step 910. If the user does meet the requirements to join a game, then at step 914, the server may optionally output elements of the game components to the console. In certain embodiments of the technology, programmatic game content will be provided by downloading some or portions of the applications 360a, 360b, to each console based on the request to participate in a game. Optimized downloading can be utilized to allow those components which present the user interface of the game, and other elements which allow the user to have a user experience if the game has started can be downloaded first. Other elements required for the game can be downloaded as necessary, or pre-fetched in a manner to allow participation in the game as needed by the user. Alternatively, at step 914, a user selects to participate in a game well in advance of the scheduled time of the game, and downloads from the gaming service 375 are required, user components for the game can be downloaded during console idle times and completed well in advance of the allowed time for the game to start. This downloading can occur when the system determines the bandwidth between the game service manager and a console is generally free from other traffic.

At step 916, a reminder indicator may be set on the console to remind the user that the user has scheduled to participate in the scheduled programmatic content.

Figure 10:
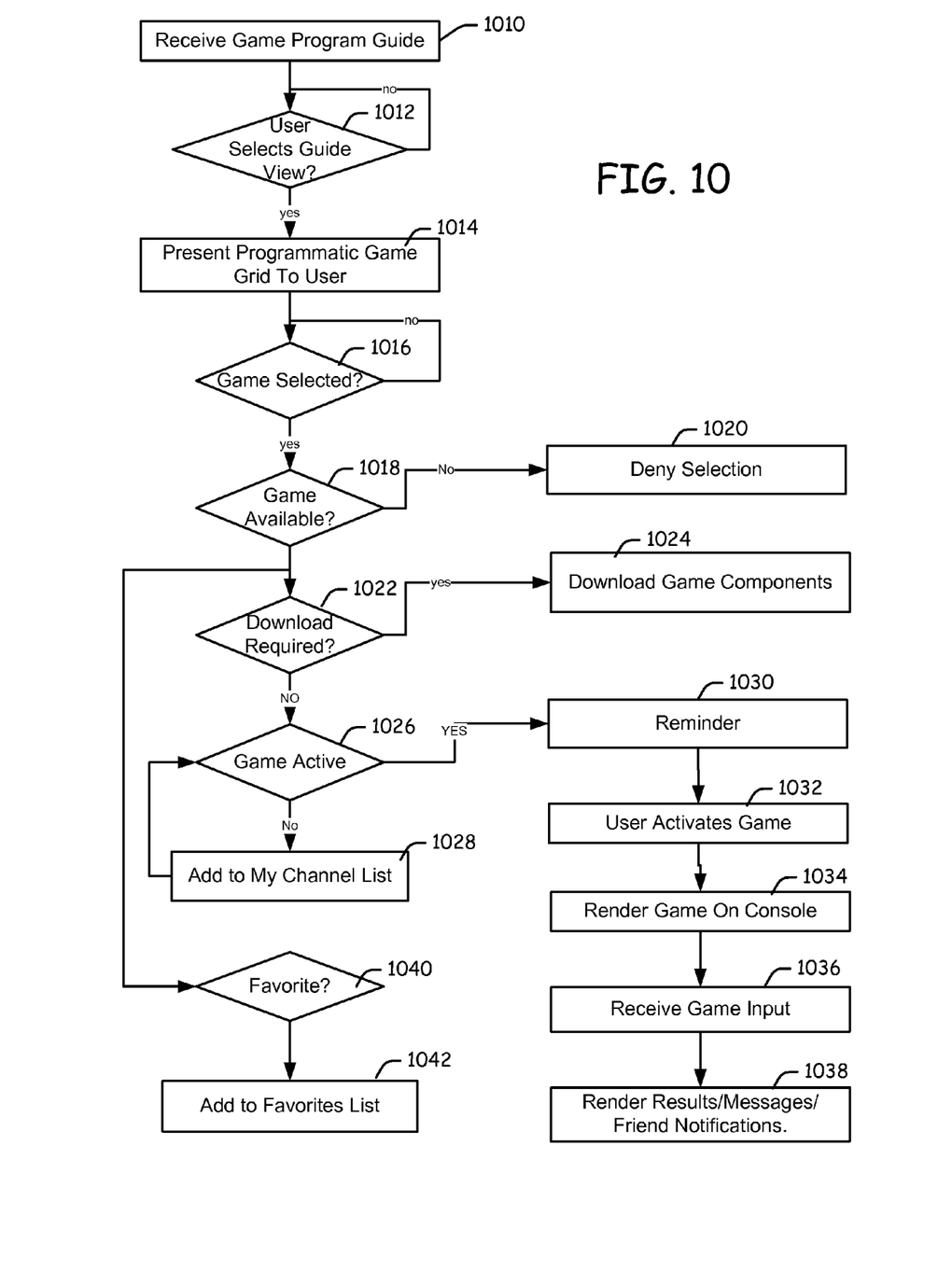
FIG. 10 illustrates a method performed on a console by a game content engine.

FIG. 10 illustrates the steps conducted by the programmatic content engine 380 to render both the user interface and the games on the console. At step 1010, once the console is initialized, the console will receive game program guide information which has been created by the developer at step 708. Once the user selects the guide view option at step 1012 (as illustrated in FIG. 4 at user interface element 506), the programmatic content grid is presented to the user at step 1014. The console will then await selection of a particular game at step 1016 and transmit the selection to the game management services. It should be understood that selections of certain games may be denied at steps 1018 and 1020 without ever transmitting information to the gaming service 376. For example, if a user attempts to select a game which has been completed, the console can deny the request locally. At step 1018, if the determination is not made locally, a determination of whether the game is available is made by awaiting the output of the method of FIG. 9 from the gaming service provider 375. If the game is not available, then the selection will be denied at step 1020. Alternatively, as discussed above, the user may be presented with the option to view the game in progress as a game viewer. At step 1040, the user may also be presented with the option of adding the game to a favorites list and if the user so selects, the game title may be added to a favorites list at step 1042.

At step 1022, a determination is made as to whether components for game play need to be downloaded. Information concerning whether a download is required may be derived from game information provided with the scheduling guide or information provided when selection of the game is made by the user. If a download is necessary, downloading begins at step 1024. Optionally, a determination may be made as to whether game play is imminent and the download optimized to render components critical for game play first. Alternatively, if game play is not imminent, component download may be queued for later processing during console idle times or based on available bandwidth.

At step 1026, the console waits for the game to become active. The game may become active at the scheduled start time or during a period in advance of the start time. During this advance period, users may be allowed to enter a "game lobby" area, view promotional media for the game, and view instructions and/or practice questions. If the game is not active, then the game can be added to the user's My Channel list at 1028 to remind the user that a selection to participate in a preprogrammed event is forthcoming. Once a game becomes active at step 1026, a reminder may be issued in advance of the game at step 1030. The game may be rendered on the console upon the command and at the specific time of the user. At step 1032, once the user activates a game, game events are rendered by the console at step 1034. Game input is received from then user at step 1036 and results of game play, message notifications in the game and other messages are rendered until the game's completion at 1038. Information on game events is provided to the console service to enable game play, while status information is provided back to the console on other events from other users in the game in a like manner.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method for providing a multiplayer game to a plurality of users, at least a portion of the game executing on a client device coupled to a network, comprising:
   (a) scheduling at least one multiplayer game event by a processor, the game event having a fixed start time and a fixed end time, said step (a) including the step of displaying a graphical user interface over a display for a user, the graphical user interface including a plurality of channels, and a plurality of time slots for multiplayer games scheduled on the plurality of channels, a friend channel of the plurality of channels displaying multiplayer game events scheduled by one or more friends of the user, the friend channel displaying a first time slot of the plurality of time slots, a first group of one or more friends of the user playing a game in the first time slot and one or more games the first group of friends are playing in the first time slot, and the friend channel displaying a second time slot of the plurality of time slots, a second group of one or more friends of the user playing a game in the second time slot and one or more games the second group of friends are playing in the second time slot;
   (b) receiving requests from users to participate in the multiplayer game event;
   (c) determining whether each of the users is eligible to participate in the multiplayer game by the processor based on when the users have selected to participate in the multiplayer game before the fixed start time;
   (d) providing instructions by the processor to one or more consoles to allow at least a subset of the plurality of users to participate in the game;
   (e) starting the game by the processor at the fixed start time; and
   (f) ending the game by the processor at the fixed end time.

2. The method of claim 1 further including the steps of providing a plurality of multiplayer games;
   repeating steps (b)-(f) for each of the plurality of multiplayer games.

3. The method of claim 2 further including providing scheduling information to a console to display the plurality of multiplayer game events to a user.

4. The method of claim 3 wherein the step of providing scheduling information includes scheduling a plurality of multiplayer game events into a sequence of timed events, and the step of providing scheduling information includes organizing multiple sequences of timed events by theme and presenting each sequence of timed events within one or more channels.

5. The method of claim 1 wherein the method further includes maintaining status information on each user request to participate in a game in advance of the fixed start time for the game.

6. The method of claim 5 further including the step of providing scheduling information for one or more games for which a user has made a request to participate in advance of the fixed start time for the game.

7. The method of claim 5 further including providing a reminder for the game.

8. The method of claim 5 further including the step of providing user-specific scheduling information in a separate channel rendered by the console.

9. The method of claim 5 further including the step of providing status information for friends of a user who have been determined eligible to participate in a game.

10. A method for providing multiplayer gaming experience in a multiplayer gaming environment, comprising:
    scheduling a plurality of multiplayer game events by a processor, each event having a fixed start time and fixed end time, said scheduling step including the steps of displaying a graphical user interface over a display for a user, the graphical user interface including a plurality of channels, and a plurality of time slots for multiplayer games scheduled on the plurality of channels, a first channel of the plurality of channels displaying games scheduled by one or more friends of the user, the first channel displaying a first time slot of the plurality of time slots, a first group of one or more friends of the user playing a game in the first time slot and one or more games the first group of friends are playing in the first time slot, and the first channel displaying a second time slot of the plurality of time slots, a second group of one or more friends of the user playing a game in the second time slot and one or more games the second group of friends are playing in the second time slot, and a second channel of the plurality of channels displaying games scheduled already by the user, the second channel displaying a third time slot of the plurality of time slots and a first game the user is scheduled to play in the third time slot, and the second channel displaying a fourth time slot of the plurality of time slots and a second game the user is scheduled to play in the fourth time slot;
    for each of the plurality of game events,
      receiving requests from users to participate in the multiplayer game event up to the fixed end time;
      determining whether each of the users is eligible to participate in the multiplayer game by the processor, said determining whether each of the user is eligible to participate in the multiplayer game event includes determining that each of the user has selected to participate in the multiplayer game event within a sufficient time before the fixed start time associated with the multiplayer game event;
      if the user is eligible to participate in the game, providing instructions to a console to allow the user to participate in the game and if the user is not eligible to participate in the game, providing instructions to a console allowing the user to view activity in the game;
      starting the game at the fixed start time; and
      ending the game at a fixed end time.

11. The method of claim 10 further including the step of providing a common set of game instructions for the plurality of games to the console.

12. The method of claim 11 further including outputting game specific instructions to each console, the game specific instructions being provided in response to a determination that the user is eligible to participate in the game.

13. The method of claim 12 wherein the game specific instructions are ordered to first provide instructions for rendering portions of the game event before all elements of the game event are ready for game play by a user.

14. The method of claim 10 wherein the step of determining whether each of the users is eligible to participate in the multiplayer game determines a player is ineligible to play after the fixed start time for the game.

15. A method for providing live commentary in a gaming experience, comprising:
   providing a plurality of multiplayer games including game play rules and instructions for a console to enable each of the plurality of multiplayer games on a console;
   scheduling at least some of the plurality of multiplayer games by a processor into one or more sequences of timed events, each timed event having a fixed duration;
   providing scheduling information to the console to display the plurality of multiplayer game events, said providing scheduling information includes the step of displaying a graphical user interface over a display for a user, the graphical user interface including a plurality of channels, and a plurality of time slots for the plurality of channels, a first channel of the plurality of channels displaying games scheduled by one or more friends of the user, the first channel displaying a first time slot of the plurality of time slots, a first group of one or more friends of the user playing a game in the first time slot and one or more games the first group of friends are playing in the first time slot, the first channel displaying a second time slot of the plurality of time slots, a second group of one or more friends of the user playing a game in the second time slot and one or more games the second group of friends are playing in the second time slot;
   receiving requests from users to participate in ones of the timed events;
   determining by the processor whether each of the users is eligible to participate in each of the timed events for which a request to participate is made, said determining whether each of the user is eligible to participate in each of the timed events for which a request to participate is made includes determining that each of the user has selected to participate in a time event within a sufficient time before a fixed start time associated with the time event;
   providing a user an option to view a multiplayer game being played at a scheduled time if it is determined that the user is not eligible to join the multiplayer game;
   providing instructions to a console to allow a user at the console to participate in the timed event for which a request to participate is made;
   starting each game; and
   ending each game after the fixed duration.

16. The method of claim 15 wherein each game event has a fixed start time and a fixed end time.

17. The method of claim 16 wherein multiple game events, each for a different multiplayer game, may be scheduled at the same start time.

18. The method of claim 17 wherein the method further includes maintaining status information on each user request to participate in a game in advance of the fixed start time for the game and providing status information for friends of a user who have scheduled to participate in game events.

19. The method of claim 18 further including the step of providing user-specific scheduling information in a separate channel rendered by the console.

* * * * *